United States Patent
Aitken et al.

(10) Patent No.: US 7,926,522 B2
(45) Date of Patent: Apr. 19, 2011

(54) FUEL FILLER SYSTEM FOR AUTOMOTIVE VEHICLE

(75) Inventors: Brian Thomas Aitken, Livonia, MI (US); Robert Joseph Beier, Plymouth, MI (US)

(73) Assignee: Ford Global Technologies, Dearborn, MI (US)

( * ) Notice: Subject to any disclaimer, the term of this patent is extended or adjusted under 35 U.S.C. 154(b) by 777 days.

(21) Appl. No.: 11/845,366

(22) Filed: Aug. 27, 2007

(65) Prior Publication Data

US 2009/0056829 A1  Mar. 5, 2009

(51) Int. Cl.
*B65B 1/04* (2006.01)
*B65B 3/00* (2006.01)

(52) U.S. Cl. ........ 141/350; 141/301; 141/348; 141/349; 220/86.2

(58) Field of Classification Search ...... 141/59, 141/301, 348–350; 220/86.2
See application file for complete search history.

(56) References Cited

U.S. PATENT DOCUMENTS

| | | | | |
|---|---|---|---|---|
| 4,091,959 A * | 5/1978 | O'Banion | ...... | 220/304 |
| 4,573,694 A | 3/1986 | Goto et al. | | |
| 4,690,293 A * | 9/1987 | Uranishi et al. | ...... | 220/86.2 |
| 4,714,172 A * | 12/1987 | Morris | ...... | 220/86.2 |
| 4,917,157 A * | 4/1990 | Gifford et al. | ...... | 141/59 |
| 5,405,040 A | 4/1995 | Keller | | |
| 5,467,621 A * | 11/1995 | Gravino | ...... | 70/171 |
| 5,944,075 A | 8/1999 | Turner et al. | | |
| 5,960,839 A * | 10/1999 | Armesto et al. | ...... | 141/304 |
| 6,223,923 B1 * | 5/2001 | Fishman | ...... | 220/210 |
| 6,349,842 B1 * | 2/2002 | Reutter | ...... | 220/201 |
| 6,446,826 B1 | 9/2002 | Foltz et al. | | |
| 6,722,407 B2 | 4/2004 | Henry | | |
| 6,755,057 B2 | 6/2004 | Foltz | | |
| 7,059,365 B2 | 6/2006 | O'Connell | | |
| 7,077,178 B2 | 7/2006 | Hedevang | | |
| 7,082,973 B2 | 8/2006 | Ganachaud et al. | | |
| 7,204,279 B2 * | 4/2007 | Bauerle | ...... | 141/350 |
| 2004/0000554 A1 * | 1/2004 | Griffin et al. | ...... | 220/304 |
| 2004/0069782 A1 | 4/2004 | Miura et al. | | |
| 2006/0169356 A1 | 8/2006 | Ganachaud et al. | | |

* cited by examiner

*Primary Examiner* — Timothy L Maust
(74) *Attorney, Agent, or Firm* — Jerome R. Drouillard; Greg P. Brown

(57) ABSTRACT

A capless fuel filler device includes an anti-contamination seal mounted upon an external portion of a fuel filler passage extending through the device. An anti-contamination plug may selectively be inserted into the combination passage so as to sealingly engage the anti-contamination seal. A contaminant drain leading from the valve body's fuel and nozzle passage serves to not only remove liquid contaminants from the fuel and nozzle passage, but also to mitigate any incidental buildup of vacuum within the fuel tank.

11 Claims, 2 Drawing Sheets

FUEL FILLER SYSTEM FOR AUTOMOTIVE VEHICLE

BACKGROUND OF THE INVENTION

1. Field of the Invention

The present invention relates to a liquid fuel filler system for use with an automotive vehicle. The filler system has a selectively employable sealing device for use with the outer portion of a capless filler neck.

2. Disclosure Information

Automotive designers have worked for some time to develop capless fuel filler systems eliminating the need for motorists to remove a separate fuel cap prior to refueling a vehicle. So-called "capless" systems generally perform well. However, in environments characterized by high levels of contamination such as dust, mud, snow and slush, as well as other types of road splash, it is possible for the antechamber extending between the outmost part of the fuel filler and the sealing door, which is pushed aside by the filler nozzle or other device, to become charged with contaminants which may then be permitted to enter the fuel tank of the vehicle when a fuel nozzle is placed into the filler neck. It would therefore be desirable to have an external closure plug to prevent the buildup of such contamination with vehicles placed in severe service. However, it is not desirable to design, tool and supply multiple fuel filler closure devices for any particular line of vehicles.

It would be desirable to have a capless fill system which may be used with or without an external closure plug, and without the need for any modification or multiple types of closure devices.

SUMMARY OF THE INVENTION

According to an aspect of the present invention, a fuel filler system for an automotive vehicle includes a filler pipe having a first end adapted for connection to a fuel tank, and a second end for receiving fuel. A capless closure device is attached to the second end of the filler pipe. The closure device includes a valve body having a combination fuel and nozzle passage extending therethrough, and a nozzle-actuated valve mounted within the combination passage. The valve has a sealing position and a filling position. An anti-contamination seal is mounted about an external portion of the fuel passage. According to another aspect of the present invention, the fuel filler system further includes an anti-contamination plug adapted to be inserted into the combination passage so as to sealingly engage the anti-contamination seal.

According to another aspect of the present invention, a contaminant drain is located within the combination passage at a position outboard of the nozzle-actuated valve. The contaminant drain also functions to prevent excessive vacuum from building within a fuel tank connected with the filler pipe in the event that flow through the tank's evaporative emission control system becomes impaired.

According to another aspect of the present invention, the anti-contamination seal includes an elastomeric ring molded upon the outermost portion of the capless closure device's valve body, about the periphery of the combination passage.

According to another aspect of the present invention, the anti-contamination plug may be lockable so as to prevent tampering with the fuel system.

It is an advantage of a fuel filler system according to the present invention that the system may be offered both with and without anti-contamination plug, without the need for changing the valve body of the capless closure device.

It is a concomitant advantage of a fuel filler system according to the present invention that the same system may be employed usefully in a variety of environments characterized by either high or low ambient contamination.

Other advantages, as well as features of the present invention, will become apparent to the reader of this specification.

DETAILED DESCRIPTION OF THE PREFERRED EMBODIMENTS

Figure 1:
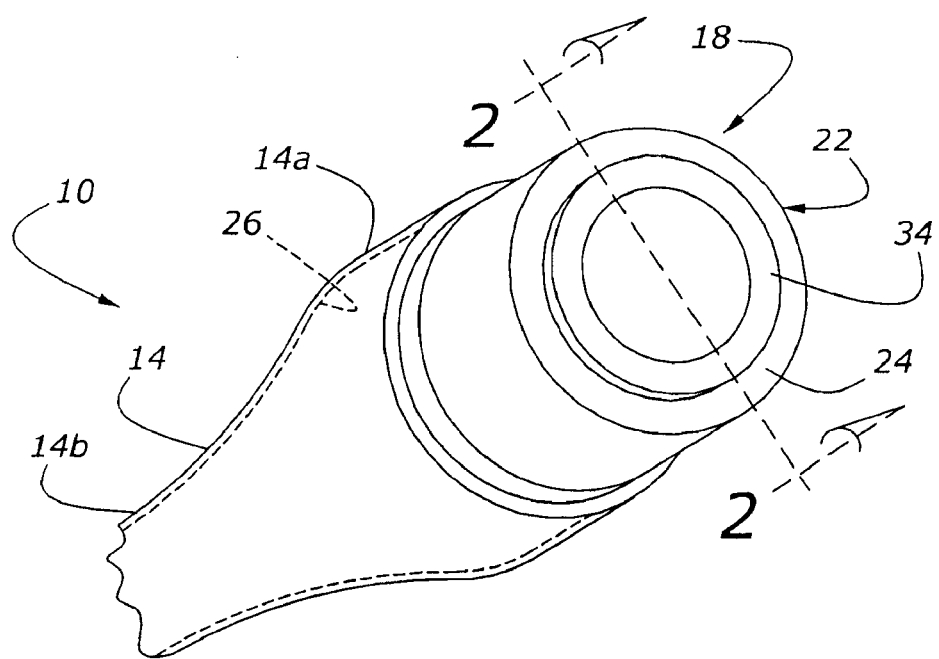
FIG. 1 is a perspective view of a fuel filler system according to the present invention.

As shown in FIG. 1, fuel filler system 10 includes a filler pipe, 14, having a first end, 14b, connected to a fuel tank (not shown), and a second end, 14a, for receiving fuel. A capless closure device, 18, is attached to second end 14a of filler pipe 14. Capless closure device 18 includes a valve body, 22, having a combination fuel and nozzle passage, 26, extending through filler pipe 14.

Figure 2:
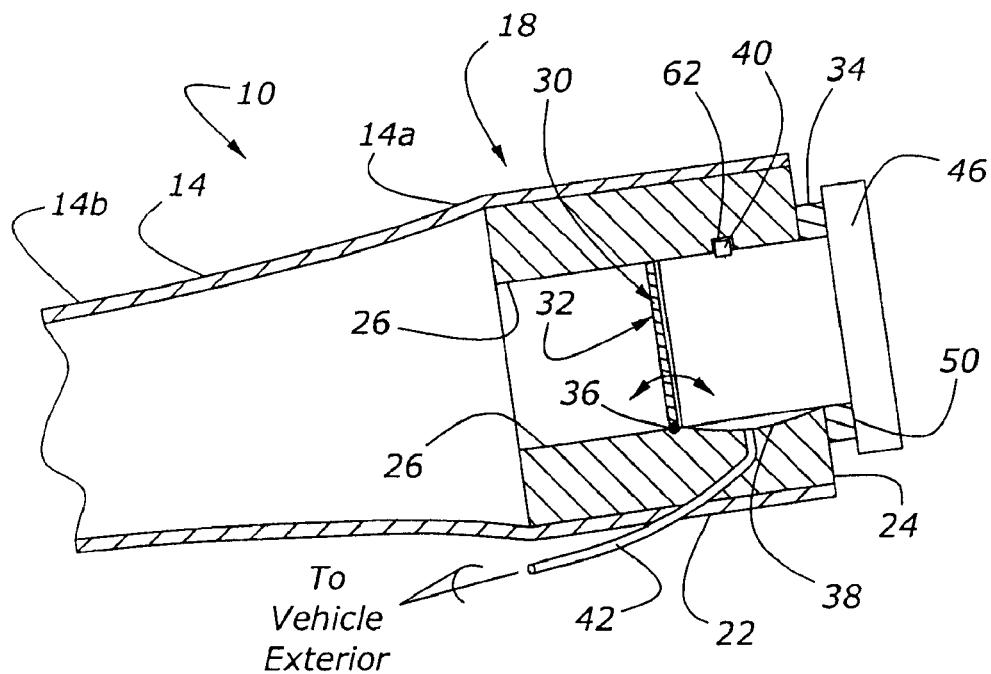
FIG. 2 is a sectional view of the filler pipe of FIG. 1, taken along the line 2-2 of FIG. 1.

As shown in FIG. 2, nozzle-actuated valve 30 is mounted within combination passage 26. Valve 30 is configured as a door, 32, mounted upon a pivot, 36, so that door 32 may be swung open when a gas pump nozzle (not shown) is inserted into filler pipe closure device 18. Door 32 seals filler pipe 14, so as to prevent outflow of gasoline liquid and vapor from filler pipe 14. Door 32 also assists in the exclusion of contamination from filler pipe 14.

Prevention of contamination intrusion into filler pipe 14 is aided by a contaminant drain including inlet basin 38, which is located within passage 26, at a position outboard of nozzle-actuated valve 30, but inboard of anti-contamination seal 34. Inlet basin 38 is connected to a drain line, 42, which allows contaminants to drop overboard to the exterior of the vehicle, so as not to build up in the space extending between door 32 and outer face 24 of valve body 22. Inlet basin 38 and drain line 42 also function as a vacuum relief to prevent unwanted vacuum from building within filler pipe 14, as well as within a fuel tank (not shown) attached to filler pipe 14.

Figure 3:
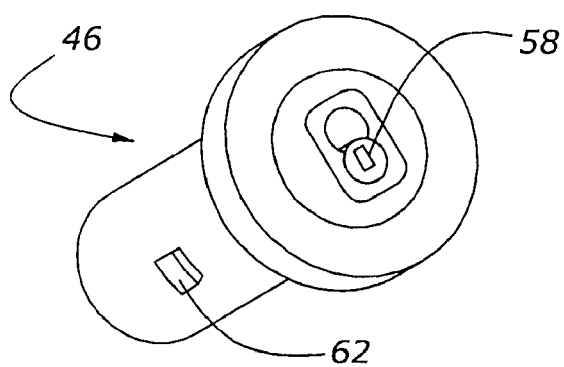
FIG. 3 is a perspective view of an anti-contamination plug adapted to be inserted into a combination passage extending through a capless closure device according to the present invention.

Anti-contamination plug 46, which is shown in detail in FIG. 3, has a lock cylinder, 58, which actuates lock bar 62. When inserted into filler pipe closure device 18, lock bar 62 fits into a notch, 40, within valve body 22, so as to retain anti-contamination plug 46 within passage 26. Plug 46 sealingly engages an anti-contamination seal, 34, which is mounted about the region of outer face 24 which is pierced by passage 26. In other words, at the outside of valve body 22, seal 34 appears as an annular ring (see FIG. 1) which is carried into an interior portion of passage 26 and molded in place upon outer face 24 of valve body 22.

When anti-contamination plug 46 is mounted to valve body 22 as illustrated in FIG. 2, plug 46 engages seal 34. In so doing, plug 46 prevents contaminants from building up within the space defined by passage 26 and extending outboard from door 32. Any liquid contamination which enters passage 26 when plug 46 is not in place, such as rain or road splash, will be allowed to drain through basin 38 and drain line 42, whether plug 46 is in place or not. Of equal importance, because the lower end of plug 46 is not sealed to passage 26, any partial vacuum tending to build up within filler pipe 14 and its associated fuel tank will advantageously be dissipated notwithstanding the placement of plug 46.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A fuel filler system for an automotive vehicle, comprising:
    a filler pipe having a first end adapted for connection with a fuel tank, and a second end for receiving fuel; and
    a capless closure device attached to the second end of the filler pipe, with said closure device comprising:
        a valve body having a combination fuel and nozzle passage extending therethrough;
        a nozzle-actuated valve mounted within said combination passage, with said valve having a sealing position and a filling position;
        an anti-contamination seal mounted about an external portion of said fuel passage;
        an anti-contamination plug adapted to be inserted into said combination fuel and nozzle passage so as to sealingly engage said anti-contamination seal; and
        a contaminant drain extending from said combination fuel and nozzle passage at a position outboard of said nozzle-actuated valve and inboard of the portion of the anti-contamination seal engaged by said anti-contamination plug.

2. A fuel filler system according to claim 1, wherein flow through said contaminant drain is not inhibited by insertion of said anti-contamination plug into said combination passage.

3. A fuel filler system according to claim 1, wherein said anti-contamination seal comprises an elastomeric ring molded upon the outermost portion of said valve body about the periphery of said combination passage.

4. A fuel filler system according to claim 1, wherein said anti-contamination plug is lockable.

5. A fuel filler system according to claim 1, wherein said nozzle-actuated valve comprises a hinged door.

6. A capless fuel filler closure device for an automotive vehicle, comprising:
    a valve body having a combination fuel and nozzle passage extending therethrough;
    a nozzle-actuated valve mounted within said combination passage, with said valve having a sealing position and a filling position;
    an anti-contamination seal mounted about an external portion of said fuel passage; and
    a vacuum relief and contaminant drain having an inlet basin located within said combination passage at a position adjacent said nozzle-actuated valve.

7. A fuel filler closure device according to claim 6, further comprising an anti-contamination plug adapted to be inserted into said combination passage so as to sealingly engage said anti-contamination seal.

8. A fuel filler system according to claim 6, wherein said inlet basin extends between said nozzle-actuated valve and said anti-contamination seal.

9. A fuel filler system according to claim 6, wherein said anti-contamination seal comprises an elastomeric ring molded upon an outermost portion of said valve body about the periphery of said combination passage, with said anti-contamination seal being adapted to sealingly engage an anti-contamination plug inserted into said combination passage.

10. A fuel filler closure device according to claim 6, wherein said vacuum relief and contaminant drain further comprises a drain line extending from said inlet basin to a location exterior to a vehicle.

11. A fuel filler closure device according to claim 6, further comprising a locking anti-contamination plug adapted to be inserted into said combination passage so as to sealingly engage said anti-contamination seal.

\* \* \* \* \*